United States Patent
Wang et al.

(10) Patent No.: US 10,657,617 B1
(45) Date of Patent: May 19, 2020

(54) METHOD AND APPARATUS FOR MEMORY ACCESS MANAGEMENT FOR DATA PROCESSING

(71) Applicant: GM Global Technology Operations LLC, Detroit, MI (US)

(72) Inventors: Shige Wang, Northville, MI (US); Wei Tong, Troy, MI (US); Shuqing Zeng, Sterling Heights, MI (US); Roman L. Millett, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/199,898

(22) Filed: Nov. 26, 2018

(51) Int. Cl.
| | |
|---|---|
| *G06T 1/00* | (2006.01) |
| *G06T 1/20* | (2006.01) |
| *G06F 9/48* | (2006.01) |
| *G06F 9/54* | (2006.01) |
| *G06F 3/06* | (2006.01) |
| *G06T 7/73* | (2017.01) |
| *G06K 9/62* | (2006.01) |
| *G06T 7/80* | (2017.01) |
| *G06F 9/38* | (2018.01) |
| *G06T 1/60* | (2006.01) |

(52) U.S. Cl.
CPC .............. *G06T 1/20* (2013.01); *G06F 3/0604* (2013.01); *G06F 3/0656* (2013.01); *G06F 3/0671* (2013.01); *G06F 9/3877* (2013.01); *G06F 9/4881* (2013.01); *G06F 9/544* (2013.01); *G06K 9/6232* (2013.01); *G06T 1/60* (2013.01); *G06T 7/73* (2017.01); *G06T 7/80* (2017.01)

(58) Field of Classification Search
CPC . G06T 1/20; G06T 1/60; G06F 3/0604; G06F 3/0656; G06F 9/3877; G06F 9/4881; G06F 9/544; G06N 3/04–049; G06N 3/063

See application file for complete search history.

(56) References Cited

U.S. PATENT DOCUMENTS

| | | |
|---|---|---|
| 2015/0286766 A1 | 10/2015 | Singh et al. |
| 2016/0316157 A1* | 10/2016 | Desai .................. H04N 5/3692 |
| 2016/0379115 A1 | 12/2016 | Burger et al. |
| 2017/0024644 A1 | 1/2017 | Van Der Made et al. |
| 2017/0103298 A1* | 4/2017 | Ling ..................... G06N 3/063 |
| 2017/0103299 A1 | 4/2017 | Aydonat et al. |
| 2017/0132754 A1* | 5/2017 | Mody ...................... G06T 3/40 |
| 2017/0277462 A1 | 9/2017 | Zhang et al. |

(Continued)

*Primary Examiner* — Charles Tseng
(74) *Attorney, Agent, or Firm* — Quinn IP Law

(57) ABSTRACT

A method and system including a central processing unit (CPU), an accelerator, a communication bus and a system memory device for dynamically processing an image file are described. The accelerator includes a local memory buffer, a data transfer scheduler, and a plurality of processing engines. The data transfer scheduler is arranged to manage data transfer between the system memory device and the local memory buffer, wherein the data transfer includes data associated with the image file. The local memory buffer is configured as a circular line buffer, and the data transfer scheduler includes a ping-pong buffer for transferring output data from the one of the processing engines to the system memory device. The local memory buffer is configured to execute cross-layer usage of data associated with the image file.

20 Claims, 5 Drawing Sheets

(56) References Cited

U.S. PATENT DOCUMENTS

| | | |
|---|---|---|
| 2017/0357891 A1 | 12/2017 | Judd et al. |
| 2018/0032857 A1 | 2/2018 | Lele et al. |
| 2018/0039886 A1 | 2/2018 | Umuroglu et al. |
| 2018/0121796 A1 | 5/2018 | Deisher et al. |
| 2018/0189229 A1 | 7/2018 | Desoli et al. |
| 2018/0204111 A1 | 7/2018 | Zadeh et al. |
| 2019/0018815 A1* | 1/2019 | Fleming ................ G06F 15/825 |

* cited by examiner

METHOD AND APPARATUS FOR MEMORY ACCESS MANAGEMENT FOR DATA PROCESSING

INTRODUCTION

An artificial neural network is a computational framework that employs multiple machine learning algorithms to work together to process complex datafiles, e.g., visual images, audio files, etc. Processor configurations to implement artificial neural networks may have suboptimal performance. Performance of a computer or processor can be evaluated in terms of an instruction execution rate or throughput, which may be expressed in millions of instructions per second (MIPS), clock speed, bus size, resource utilization, memory size, latencies, bandwidth, throughput, etc.

Hardware configurations for implementing artificial neural networks may include a central processing unit (CPU) that operates in conjunction with an accelerator to process image files or other data that is captured on a memory device. An accelerator may utilize specialized hardware in the form of general purpose computing on graphics processing units (GPGPUs), multi-core processors, field programmable gate arrays (FPGAs), and application specific integrated circuits (ASICs).

One embodiment of an artificial neural network is a convolutional neural network (CNN), which has been shown to be an effective tool for performing image recognition, detection, and retrieval. CNNs may be scaled up and configured to support large labeled datasets that are required for the learning process. Under these conditions, CNNs have been found to be successful in learning complex and robust image features. A CNN is a type of feed-forward artificial neural network where individual neurons are tiled in a manner such that they respond to overlapping regions in a field of view.

An artificial neural network executing image processing routines may transfer large quantities of data between storage devices and on-chip buffers, which may include relatively small memory storage devices that may be associated with an accelerator that may be employed in executing the artificial neural network. Limitations in bus transfer rates may lead to frequent data transfers with an associated large overhead when executing a vision processing algorithm in an artificial neural network that employs an embodiment of the accelerator.

SUMMARY

A method and system for dynamically processing an image file are described and includes a central processing unit (CPU), an accelerator, a communication bus and a system memory device, wherein the system memory device is configured to store the image file. The accelerator includes a local memory buffer, a data transfer scheduler, and a plurality of processing engines. The local memory buffer includes an input buffer and an output buffer, wherein the input buffer is in communication with an input register set for one of the plurality of processing engines and the output buffer is in communication with an output register set for the one of the processing engines. The data transfer scheduler is arranged to manage data transfer between the system memory device and the local memory buffer, wherein the data transfer includes data associated with the image file. The local memory buffer is configured as a circular line buffer, and the data transfer scheduler includes a ping-pong buffer for transferring output data from the one of the processing engines to the system memory device. The local memory buffer is configured to execute cross-layer usage of data associated with the image file.

An aspect of the disclosure includes the image file being a bitmap image file including a field of view from a camera.

Another aspect of the disclosure includes the data transfer scheduler being configured to manage data transfer between the system memory device and the local memory buffer includes the data transfer scheduler being configured to manage data transfer that includes data associated with a portion of the image file.

Another aspect of the disclosure includes the local memory buffer being configured as a circular line buffer including reading and transferring a first quantity of rows of the bitmap image file to the input buffer for processing by the one of the processing engines, and concurrently updating a next quantity of rows into the input buffer.

Another aspect of the disclosure includes the ping-pong buffer for transferring output data from the one of the processing engines to the system memory device including the output buffer being arranged as a double buffer including a first output buffer and a second output buffer, wherein the one of the processing engines is controlled to communicate the output data with the first output buffer coincident with the second output buffer being controlled to communicate with the system memory device in a first iteration, and wherein the one of the processing engines is controlled to communicate the output data with the second output buffer coincident with the first output buffer being controlled to communicate with the system memory device in a second, subsequent iteration.

Another aspect of the disclosure includes the one of the processing engines being controlled to communicate with the second output buffer coincident with the first output buffer being controlled to communicate with system memory device in the second, subsequent iteration only after the second output buffer completes the communication with the system memory device and after the one of the processing engines generates the output data.

An aspect of the disclosure includes the datafile being a bitmap image file of a field of view that is captured by a camera, wherein the CPU employs the accelerator to extract the feature from the bitmap image file.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
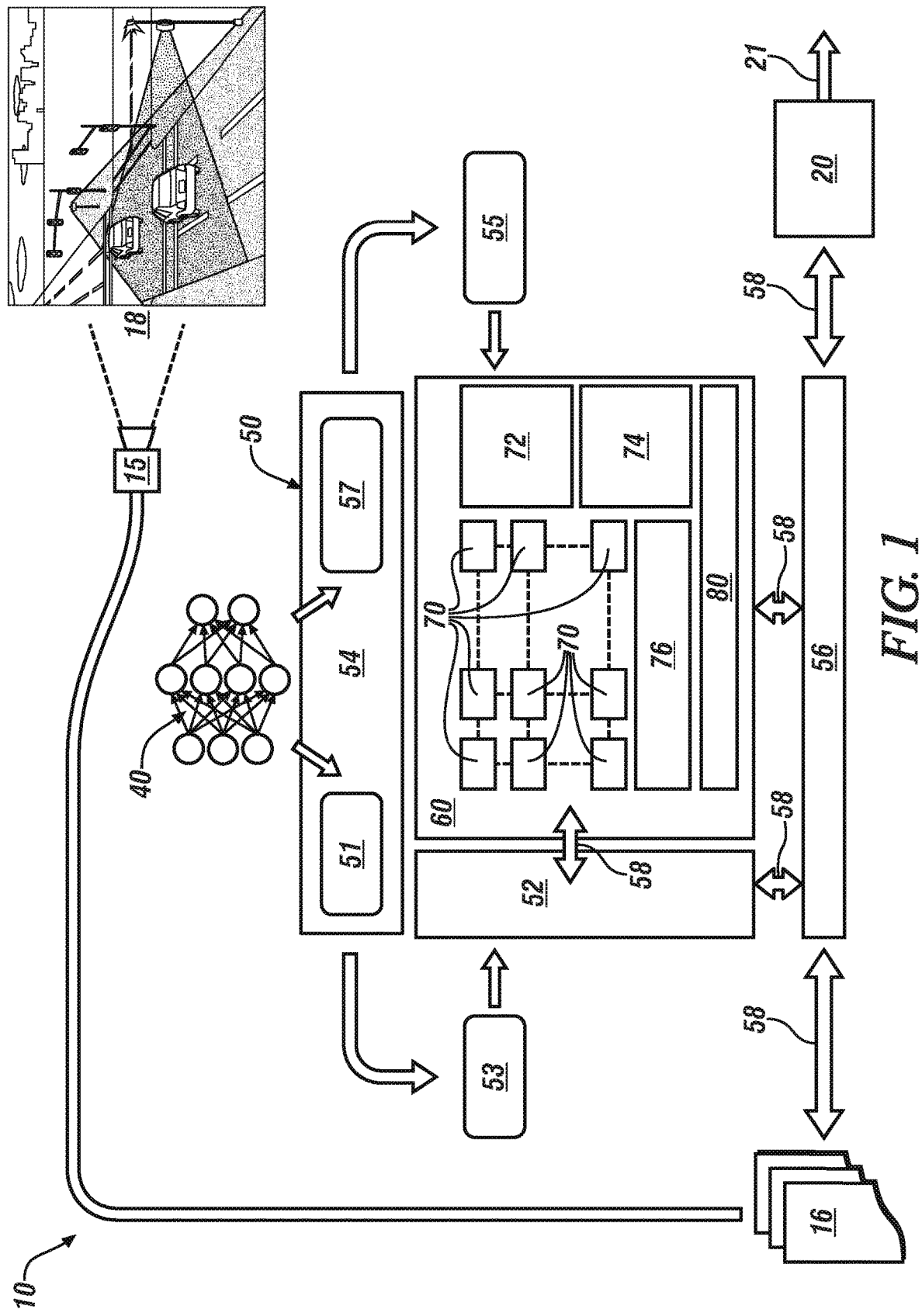
FIG. 1 schematically illustrates a system for processing a datafile, including a central processing unit (CPU) and an accelerator that are configured to execute a neural network, wherein the datafile processing system is an element of a vehicle control system that includes a sensing system and a control system, in accordance with the disclosure.
Figure 2:
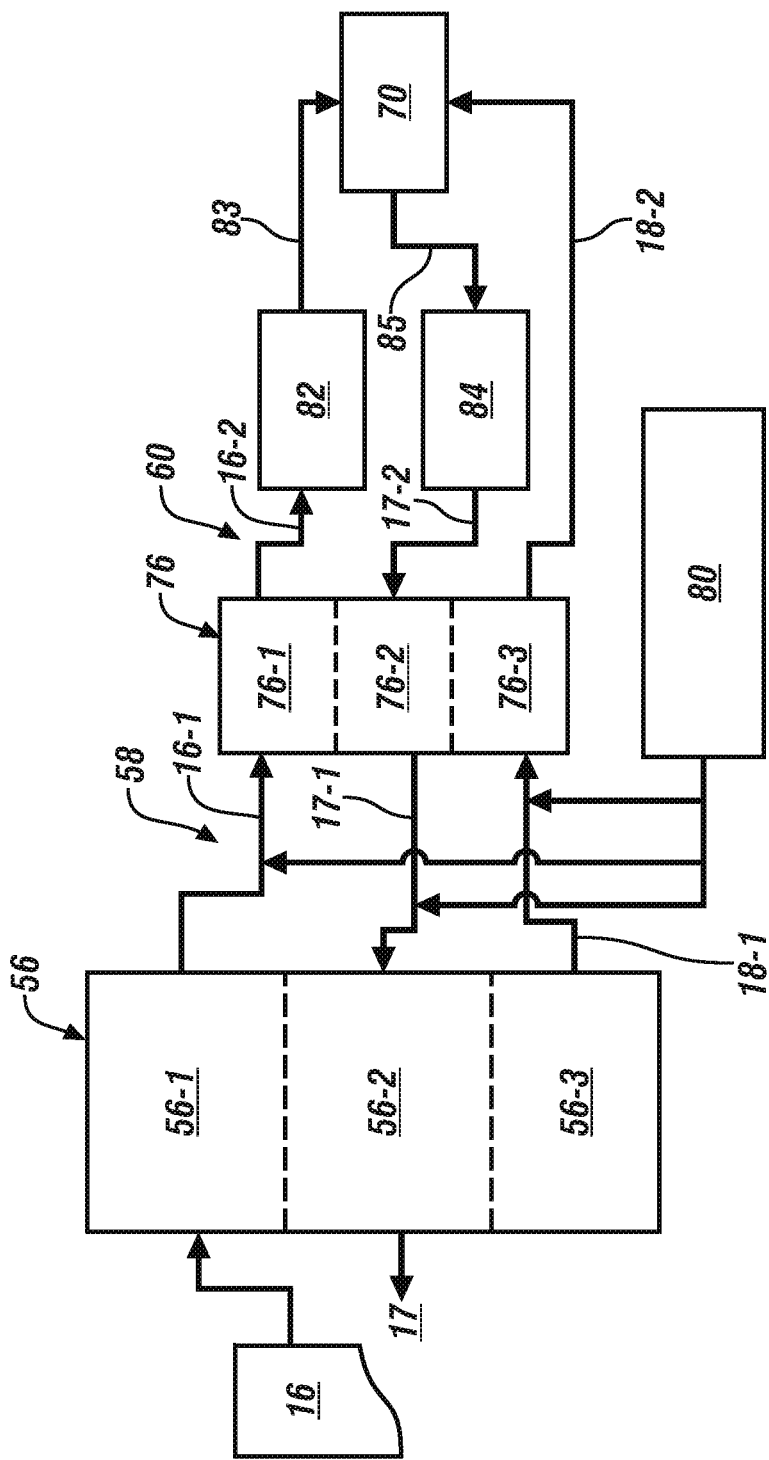
FIG. 2 schematically shows a memory architecture for data transfer to a processing engine (PE) of an accelerator, for data transfer of a bitmap image file between a system memory device and a local memory buffer for processing in the PE, in accordance with the disclosure.

Referring now to the drawings, wherein the depictions are for the purpose of illustrating certain exemplary embodiments and not for the purpose of limiting the same, FIGS. 1 and 2 schematically illustrate a datafile processing system 50 including a central processing unit (CPU) 52 and an accelerator 60 that are configured to execute an artificial neural network 40, wherein the datafile processing system 50 may be an element of a vehicle control system 10 that includes a sensing system 15 and a control system 20. The sensing system 15 may be configured to capture data, which may be communicated to the datafile processing system 50. The datafile processing system 50 may be configured to extract a feature from the captured data, and communicate the feature to the control system 20, which may be configured to execute a control action 21 based thereon.

In one embodiment, and as described herein, the vehicle control system 10, sensing system 15, datafile processing system 50, and control system 20 are disposed on a vehicle. In one embodiment, the control system 20 includes an autonomous control system, including, e.g., one or a plurality of actuators for an adaptive cruise control system, an autonomous steering control system, an autonomous braking, etc. In one embodiment, the sensing system 15 may be a digital camera that dynamically captures a bitmap image file 16 of a field of view 18 of the digital camera. In one embodiment, the datafile processing system 50 may be configured to dynamically process signal files to extract one or more features from the bitmap image file 16 of the field of view 18 of the digital camera, which can include detecting an obstruction in a travel path of the vehicle. In one embodiment, the control system 20 may be configured to execute the control action 21 in response to the extracted feature, e.g., implement autonomous braking control, autonomous speed control or autonomous steering control based upon the detected obstruction in the travel path of the vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. It is appreciated that the specific implementation described hereinabove is a non-limiting illustration of one embodiment. The concepts described herein apply to various embodiments of the datafile processing system 50 as described herein.

The datafile processing system 50 includes the CPU 52, a first memory device 54, a system memory device 56, which may be configured as random-access memory (RAM) device or a dynamic RAM (DRAM) device, and the accelerator 60, which interconnect and communicate via a communication bus 58. The system memory device 56 may be partitioned into a system input memory 56-1, a system output memory 56-2, and a kernel parameter memory 56-3. The first memory device 54 includes algorithmic code in the form of a first set of instructions 51, which may be accessed as CPU instructions 53 to control operation of the CPU 52. The first memory device 54 also includes algorithmic code in the form of a second set of instructions 57, which is in the form of an accelerator instruction 55 that may be accessed to dynamically control configuration of the accelerator 60. The first and second sets of instructions 51, 57 are arranged to execute the artificial neural network 40. The CPU 52 and the accelerator 60 execute their respective CPU and accelerator instructions 53, 55 to extract a feature from the bitmap image file 16, which can be communicated to the control system 20.

In one embodiment, the accelerator 60 is configured as a multi-layer array that is composed of a plurality of processing engines (PEs) 70 that are arranged to effect fast dense matrix-matrix operation and matrix-vector operation. The PEs 70 may include, by way of non-limiting examples, a composable rectified linear (ReLU) operator, a convolution (cony) instruction, a deconvolution instruction (deconv), an averaging (avgpool) operator, and a maximum (maxpool) operator.

The accelerator 60 may be configured as a graphics processing unit (GPU), a field-programmable gate array (FPGA), a digital signal processor (DSP) or another integrated circuit that is configured to support high-speed, repetitive, numerically intensive data processing tasks.

The accelerator 60 includes the array of PEs 70, an instruction set fetcher 72, an instruction scheduler 74, and a local memory buffer 76, wherein the local memory buffer 76 is partitioned into an input buffer 76-1, an output buffer 76-2, and a kernel parameter buffer 76-3. A data transfer scheduler 80 is configured to manage data transfer between the local memory buffer 76 and the system memory device 56, with the data transfer being accomplished via the communication bus 58. The second set of instructions 57 include accelerator instructions 55 that are employed to dynamically configure the accelerator 60. Advantageously, the accelerator instructions 55 and the instruction scheduler 74 configure the PEs 70 of the accelerator 60 to match computation demands. Frequently-used operators are configured in uniformed format, with operators implemented in flexible configuration of hardware. There are mechanisms to merge layers to reduce data transfer, with the instruction scheduler 74 operating to fill the input and manage the activation of instructions. Each bitmap image file 16 is stored in the system memory device 56.

The CPU 52 executes the CPU instruction set 53 including employing the accelerator 60 to process data in the form of a subset of data from the bitmap image file 16 that is stored in the system memory device 56 to extract one of more features.

A system for dynamically processing an image file is described, wherein the image file includes, in one embodiment, the bitmap image file 16 of the field of view 18 of the digital camera that is described with reference to FIG. 1. The local memory buffer 76 includes the input buffer 76-1, which is in communication with an input register set 82 for communication to one of the PEs 70. The local memory buffer 76 includes the output buffer 76-2, which is in communication with an output register set 84 that is in communication with the respective PE 70. The data transfer scheduler 80 is arranged to manage data transfer between the system input memory 56-1 of the system memory device 56 and the input buffer 76-1 of the local memory buffer 76, and data transfers include data associated with a portion of the bitmap image file 16, i.e., a kernel, which is stored in the input buffer 76-1. As described herein, the data transfer scheduler 80 includes a circular line buffer for transferring input data from the system memory device 56 to the input buffer 76-1. As described herein, the data transfer scheduler 80 includes a ping-pong buffer for transferring output data from the PE 70 to the system memory device 56. Furthermore, the local memory buffer 76 is configured to execute cross-layer usage of data associated with the bitmap image file 16. As such, the datafile processing system 50 provides a memory architecture, memory configuration, and patterns of accessing memory devices that reduce or minimize the amount of off-chip data transfers, such as may be required by high-volume data exchanges in high-performance vision algorithms. This includes operations that exploit usage of localized data for reuse and data independence for parallel operations. This also includes loop transformation to maximize data locality for reuse of on-chip memory. This includes use of circular organization of data buffers to minimize transfer of input data. This includes use of a ping-pong buffer strategy for data output to improve the parallel operations between computations and output data transfers.

FIG. 2 schematically illustrates an example of an architecture for memory configuration and data transfer to one of the PEs 70, which may be advantageously arranged and executed by the datafile processing system 50 to minimize overhead caused by data transfer of the bitmap image file 16 between the system memory device 56 and the local memory buffer 76 for timely processing in the PE 70. Each iteration, portions of the bitmap image file 16 can be stored in the system memory device 56 and transferred to the local memory buffer 76 for processing in the PE 70. The architecture includes the system memory device 56, the local memory buffer 76, and the data transfer scheduler 80, which work in concert to transfer data to and from the PE 70 via an input register set 82 and an output register set 84. The architecture minimizes or eliminates the need for duplicative data transfer of portions of the bitmap image file 16 from the system memory device 56 to the local memory buffer 76.

The system memory device 56 is configured as RAM devices and read-only memory (ROM) devices that are partitioned into the system input memory 56-1, the system output memory 56-2, and the kernel parameter memory 56-3, wherein the aforementioned portions are separate and distinct portions thereof. The input memory portion 56-1 and output memory portion 56-2 includes one or more RAM devices and the kernel parameter memory 56-3 includes one or more ROM devices.

The local memory buffer 76 is configured as one or more RAM devices that are partitioned into the input buffer 76-1, the output buffer 76-2, and the kernel parameter buffer 76-3. The partition boundaries can be reconfigured in accordance with system memory requirements.

The input memory portion 56-1 communicates via the communication bus 58 with the input buffer 76-1 to transfer a first data segment 16-1 of the bitmap image file 16 based upon a command from the data transfer scheduler 80, with successive iterations of communication via the communication bus 58 being executed to transfer the entire bitmap image file 16. The input buffer 76-1 transfers a second data segment 16-2, which is derived from the first data segment 16-1, to the input register set 82, which transfers it as input 83 to the PE 70 for execution in an operation associated with the specific nature of the PE 70. The second data segment 16-2 may include all or a portion of the data contained in the first data segment 16-1 of the bitmap image file 16, and may also be reorganized as described herein.

The PE 70 executes an operation that generates a result 85 that is stored in the output register set 84 and transferred as a second result segment 17-2 to the output buffer 76-2. A first result segment 17-1 is a compilation of one or more second result segments 17-2 that are attained during iterative steps of operation, as described herein. In a similar manner the output buffer 76-2 communicates the first result segment 17-1 to the output memory portion 56-2 via the communication bus 58 based upon a command from the data transfer scheduler 80. A plurality of first result segments 17-1 are compiled to generate a final result 17, which is in the form of a feature that has been extracted from the bitmap image file 16, which may be communicated to the control system 20.

The kernel parameter memory 56-3 communicates a kernel 18-1 to the kernel parameter buffer 76-3 via the communication bus 58, and the kernel parameter buffer 76-3 transfers a kernel segment 18-2 to the PE 70. This architecture permits organization of the datafile, e.g., the bitmap image file 16 in a manner that improves locality. Furthermore, the system memory device 56 and the local memory buffer 76 can be dynamically configured for re-use of the first data segment 16-1 of the bitmap image file 16, and data transfer and data communication can be advantageously scheduled to improve reuse of the first data segment 16-1. The input buffer 76-1 can be organized to support re-use of the input data, i.e., successive iterations of the first data segment 16-1. The output buffer 76-2 can be organized to support both cross-layer and parallel operations. Furthermore, the memory sizes of the input buffer 76-1 and the output buffer 76-2 can vary for different layers to match computation. Furthermore, this configuration permits use of a fixed quantity of registers for each layer. The overall goal of this data organization structure is to match the communication capacity with the computational capacity of the datafile processing system 50 described herein. This concept is described with reference to a convolution (cony) instruction. Other NN operators that may be implemented in hardware in a similar manner may include deconvolution (deconv), rectified linear (ReLU), averaging (avgpool), and maximum (maxpool) operators.

Loop transformation includes a method of arranging input data to improve data locality, which facilitates aggregate operations of the same data together with a maximum size of a data set, and reduced data movement between the system memory 56 and the memory buffer 76. The loop transformation process includes identifying data dependencies across nested loops to reduce the quantity of system memory accesses and associated communication. The loop transformation process allows unrolling of independent loop among inputs to increase data parallelism and pipelining of data from input to output in independent loops to increase function parallelism.

Figure 3:
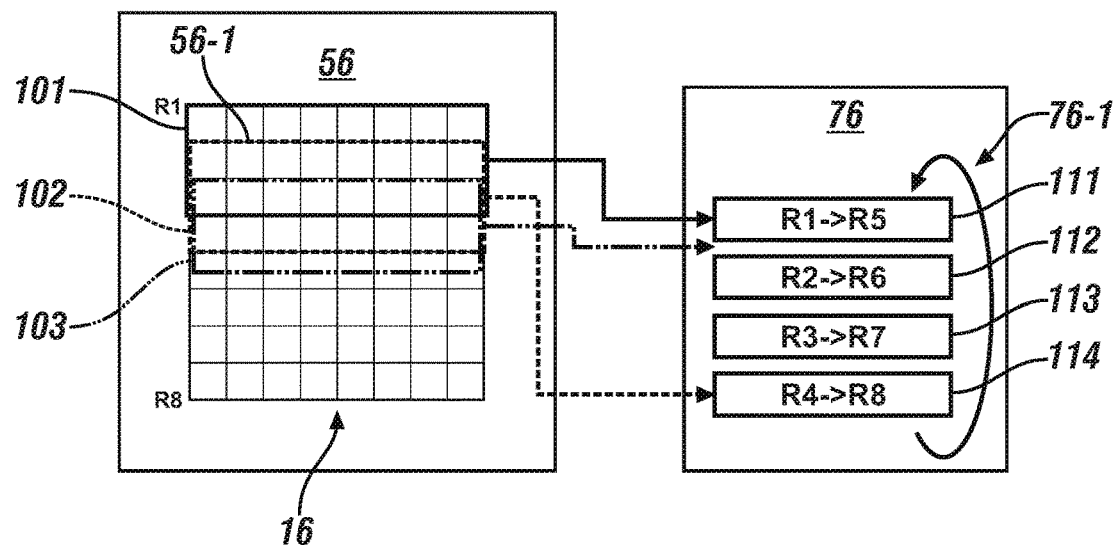
FIG. 3 schematically shows an example arrangement of a circular line buffer for re-use of input data, including data transfer of a bitmap image file between a system memory device and a local memory buffer for processing in a PE, in accordance with the disclosure.

FIG. 3 schematically shows an example of a circular line buffer for re-use of the input data without reloading. This includes bus data transfer via the communication bus 58 of the bitmap image file 16 between the system memory device 56 and the local memory buffer 76 for timely processing in the PE 70. The example bitmap image file 16 is configured as an 8×8 array of pixels, including rows R1 through R8. Three kernels are indicated, including kernel K1 101, kernel K2 102 and kernel K3 103, wherein the adjacent kernels overlap by one row. As shown, the three kernels K1 101, K2 102 and K3 103 have a kernel size (k) of 3 rows and are arranged with a stride (s) of 1, i.e., k=3, s=1. When the input buffer 76-1 is organized in a circular manner, for a kernel with size k and stride s, the size of the input buffer 76-1 can be determined as being equal to min(k+s, R), wherein R is the total number of rows contained in the bitmap image file 16. In operation, the first k quantity of the rows are read first, and transferred to the input buffer 76-1 for use in computations at the respective PE 70 (shown in FIG. 2). Concurrently, the next s rows are updated into the input buffer 76-1 to improve parallelism. When the data update includes any row defined by r>k+s, the input buffer 76-1 uses r mod (k+s) line buffer. As shown, the input buffer 76-1 includes five rows of data, which initially includes rows R1-R5 111, which are successively overwritten by rows R2-R6 112, and then rows R3-R7 113, and then rows R4-R8 114. The overwriting process preserves the rows that are held in common, thus eliminating the need to transfer the same data during successive transfers of overlapping data. In organizing data in this manner, the circular line buffer described with reference to FIG. 3 can be employed to facilitate re-use of the input data. An example of an algorithm for the circular data buffer includes as follows.

```
for (ifm_row=0; ifm_row<fm_input_R; ifm_row+=TileR)
   for(ifm_col=0: ifm_col<fm_input_C: ifm_col+=TileC)
      for (ofm_index, ofm_index>fm_output_M; ofm_index+=TileM)
         for (ifm_index=0; ifm_iindex<fm_input_N, ifm_index+=TileN)
            // copy data blocks from system memory to device memory
            // computation on device
            // copy result from device memory to system memory
            for (kernel_row=0; kernel_row<K; kernel_row++)
               for (kernel_col=0 kernel_col<K; kernel_col++)
                  for (ofm_tindex=0; ofm_tindex<ofm_index+TileM; ofm_
                     tindex++)
                     for (ifm_tindex=0; ifm_tindex<ifm_index+TileN; ifm_
                        tindex++)
                        for (tile_row=ifm_row; tile_row<TileR; tile_row++)
                           for (tile_col=ifm_col; tile_col<TileR; tile_col++)
                              mac_compute(. . .)
```

Figure 4:
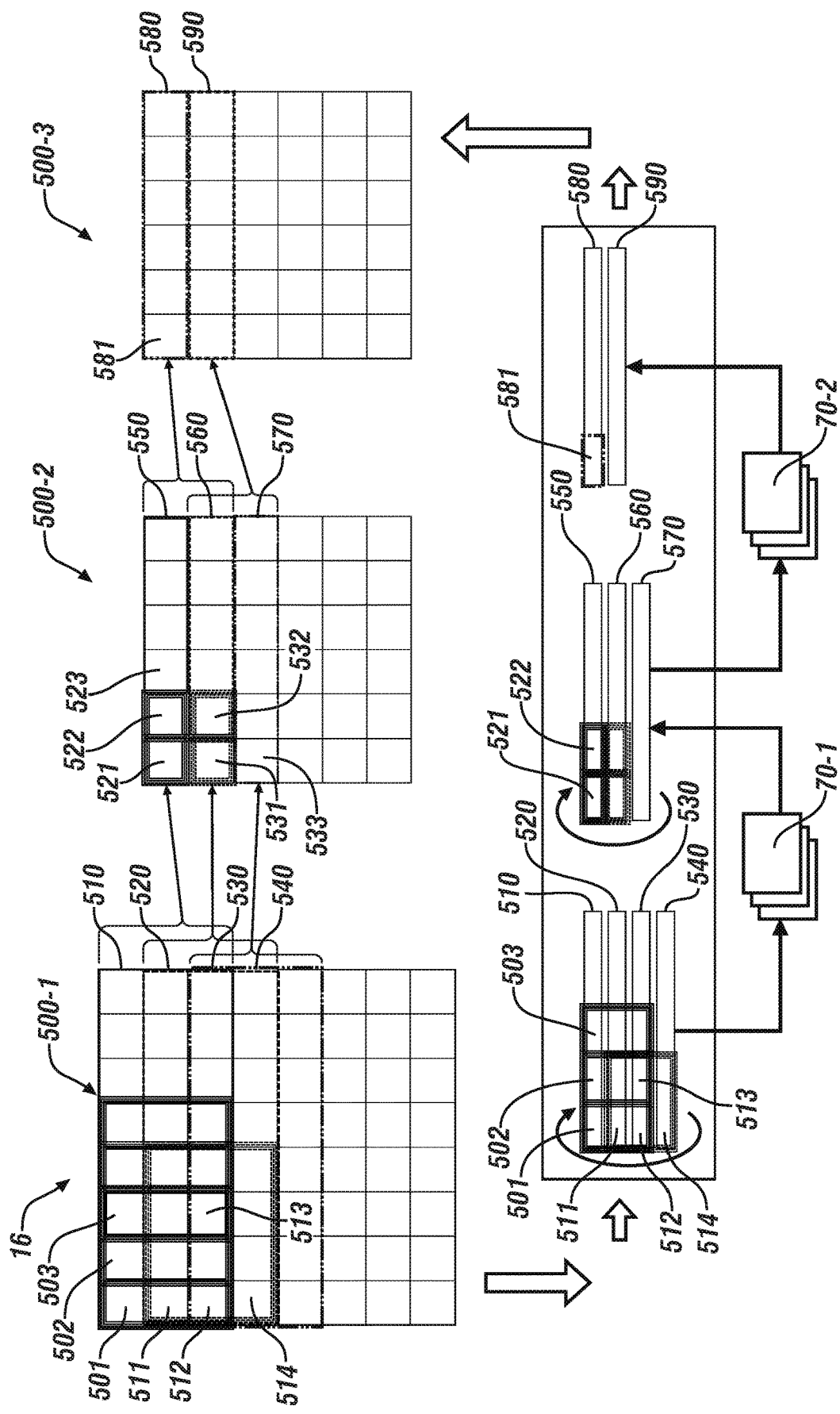
FIG. 4 schematically shows processing of an original image employing a circular line buffer including data transfer of a bitmap image file between a system memory device and a local memory buffer for processing in a PE FIG. 5 schematically shows a hardware arrangement that includes a double buffer configuration to effect communication from a PE to a system memory device employing an output buffer of a local memory buffer, in accordance with the disclosure.

FIG. 4 schematically shows an original image 500-1 that may be stored on the local memory buffer 76 and processed employing the accelerator 60 that is shown with reference to FIG. 1, and a first processed image 500-2 and a second processed image 500-3. The arrangement facilitates cross-layer data usage and avoids off-chip data transfer by storing results between executions of layers of the accelerator 60.

The original image 500-1 is composed as an 8×8 two-dimensional memory location, and may contain a two-dimensional array of pixels from an image, e.g., image 16 that is captured by the sensing device 15, e.g., a camera, described with reference to FIG. 1. The pixels may be clustered into a plurality of 3×3 kernels that overlap by a single stride in the horizontal direction and a single stride in the vertical direction. A first row 510, second row 520, third row 530 and fourth row 540 of the pixels are indicated. The first processed image 500-2 may be composed as a 6×6 two-dimensional memory array, including a plurality of rows, with a rows 550, 560 and 570 being indicated. The second processed image 500-3 may be composed as a 5×5 two-dimensional memory array, including a plurality of rows, with rows 580 and 590 being indicated.

Referring again to the original image 500-1, the overlapped 3×3 kernels in the horizontal direction include a total of 6 strides, with first, second and third horizontal kernels 501, 502, 503, respectively, indicated. Likewise, the overlapped 3×3 kernels in the vertical direction include a total of 6 strides, with first, second and third vertical kernels 501, 511, and 512, respectively, indicated. Each of the 3×3 kernels is provided as input to a first one of the PEs, indicated by numeral 70-1. The PE 70-1 is configured to return a single parameter that is storable in a single memory location in the buffer 76.

As shown, a first parameter is associated with processing of the first horizontal kernel 501 via PE 70-1, and is stored in memory location 521 of the first row 550 of the first processed image 500-2. A second parameter is associated with processing of the second horizontal kernel 502 via PE 70-1, and is stored in memory location 522 of the first row 550 of the first processed image 500-2. A third parameter is associated with the processing of the third horizontal kernel 503 via PE 70-1, and is stored in memory location 523 of the first row 550 of the first processed image 500-2. The first parameter associated with the processing of the first horizontal kernel 511 of the second row 520 via PE 70-1 is stored in the memory location 531 of the second row 560 of the first processed image 500-2. The second parameter associated with the processing of the second horizontal kernel 513 of the second row 520 via PE 70-1 is stored in the memory location 532 of the second row 560 of the first processed image 500-2. The third parameter associated with the processing of the first horizontal kernel 512 of the third row 530 via PE 70-1 is stored in the memory location 533 of the third row 570 of the first processed image 500-2. The fourth parameter associated with the processing of the first horizontal kernel 514 of the fourth row 540 via PE 70-1 is stored in the fourth row of the first processed image 500-2, etc. In this manner, the entire 6×6 array of the first processed image 500-2 can be populated by the result of the processing, via PE 70-1, of each of the overlapping 3×3 kernels containing the plurality of parameters associated with the pixels of the original image 500-1 using the PE 70-1.

The 6×6 array of the first processed image 500-2 can be subjected to additional processing by sequentially providing overlapping 2×2 kernels thereof as inputs to a second one of the PEs 70, i.e., PE 70-2, which returns a single parameter that is storable in a single memory location in the buffer 76, i.e., corresponding memory location 581 that is depicted in the second processed image 500-3.

By way of example, the 2×2 kernel of the first processed image 500-2 that is composed of the data stored in memory locations 521, 522, 531 and 532 can be provided as a kernel for processing by the second PE 70-2, which returns a single parameter that is storable in memory location 531 of the second processed image 500-3. In like manner, the entire 5×5 array of the second processed image 500-3 can be populated by the result of processing of the overlapping 2×2 kernels containing the parameters associated with the memory locations of the first processed image 500-2 using the second PE 70-2.

This configuration permits results to be stored between layers to avoid off-chip data transfer. Furthermore, processing of layer i+1 can be initiated before processing layer i is complete because computation of i+1 and i are independent, and associated weights and outputs are irrelevant. As such, there is no need to wait until all computations of the k row are completed. Instead, processing of each of the rows can be scheduled to begin as soon as there is sufficient data to compute the next stage, providing a balance between buffer size and function parallelism. Furthermore, reuses are in consecutive computations and can be discarded once moving to the next computation. In organizing data in this manner, the circular line buffer described with reference to FIG. 3 can be employed to facilitate re-use of the input data.

Figure 5:
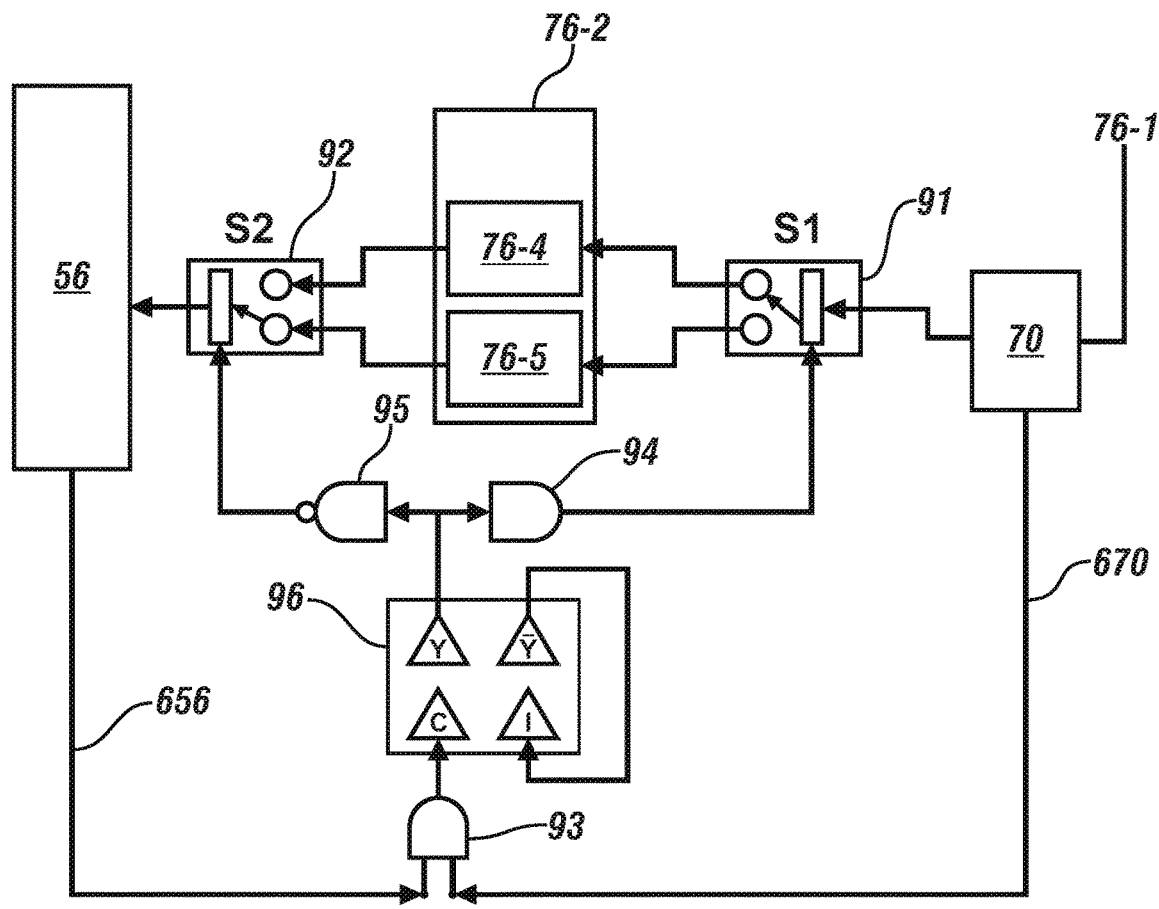

FIG. 5 schematically shows an arrangement that includes a double buffer configuration to effect communication from one of the PEs 70 to the system memory device 56 employing the output buffer 76-2 of the local memory buffer 76 in concert with an arrangement of electronic logic elements. The output buffer 76-2 is arranged as a double buffer, with two portions, including a first output buffer portion 76-4 and a second output buffer portion 76-5. The electronic logic elements include a first switch 91, a second switch 92, AND gates 93, 94, NAND gate 95, and switch logic 96, which may be in the form of a flip-flop device. The communication arrangement includes the PE 70 having an output link in communication with an input to the first switch 91, with the first switch 91 having two output links that are in communication with the first output buffer portion 76-4 and the second output buffer portion 76-5. The first output buffer portion 76-4 and the second output buffer portion 76-5 are both in communication with the second switch 92, which has an output link that is in communication with the system memory 56.

There are two relevant functions being executed in this scenario, which may have different execution times. The PE 70 is executing a computational function based upon data that is being transferred from the input buffer 76-1, and the system memory 56 performing a data storage function for data that is being transferred thereto, wherein the data is the output from the computation of the PE 70. The system memory 56 includes an output link 656 that communicates a discrete signal indicating whether data transfer from the output buffer 76-2 is completed. In a similar manner, the PE 70 includes an output link 670 that communicates a discrete signal indicating whether the computational function of the PE 70 has been completed.

In the arrangement as depicted, data that is generated by the computation of PE 70 is transferred via the first switch 91 to the first output buffer portion 76-4 for storage, and simultaneously, data that is stored in the second output buffer portion 76-5 is transferred via the second switch 92 to the system memory 56.

Additional data is transferred from the input buffer 76-1 to the PE 70 for computation. At the same time, system memory 56 resets the discrete signal on output link 656 and the PE 70 resets the discrete signal on output link 670.

When the system memory 56 indicates that data transfer from the output buffer 76-2 is completed and the PE 70 indicates that the computational function has been completed, the AND gate 93 generates a discrete "1" or high output, which is input to the switch logic 96. The switch logic 96 executes a flip-flop action to generate an output signal that is simultaneously input to the AND gate 94 and the NAND gate 95. The output from the AND gate 94 causes the first switch 91 to transfer the communication link such that the PE 70 is in communication with the second output buffer portion 76-5, and the output from the NAND gate 95 causes the second switch 92 to transfer the communication link such that the first output buffer portion 76-4 is in communication with the system memory 56 (not shown).

When, subsequently, the next iteration of data transfer is complete and the next iteration of computation by the PE 70 is complete, the switch logic 96 reverts to its original condition (as shown) and the next iteration begins. In this manner, the double buffer arrangement permits working in a ping-pong fashion for communication and computation for successive iterations.

Figure 6:
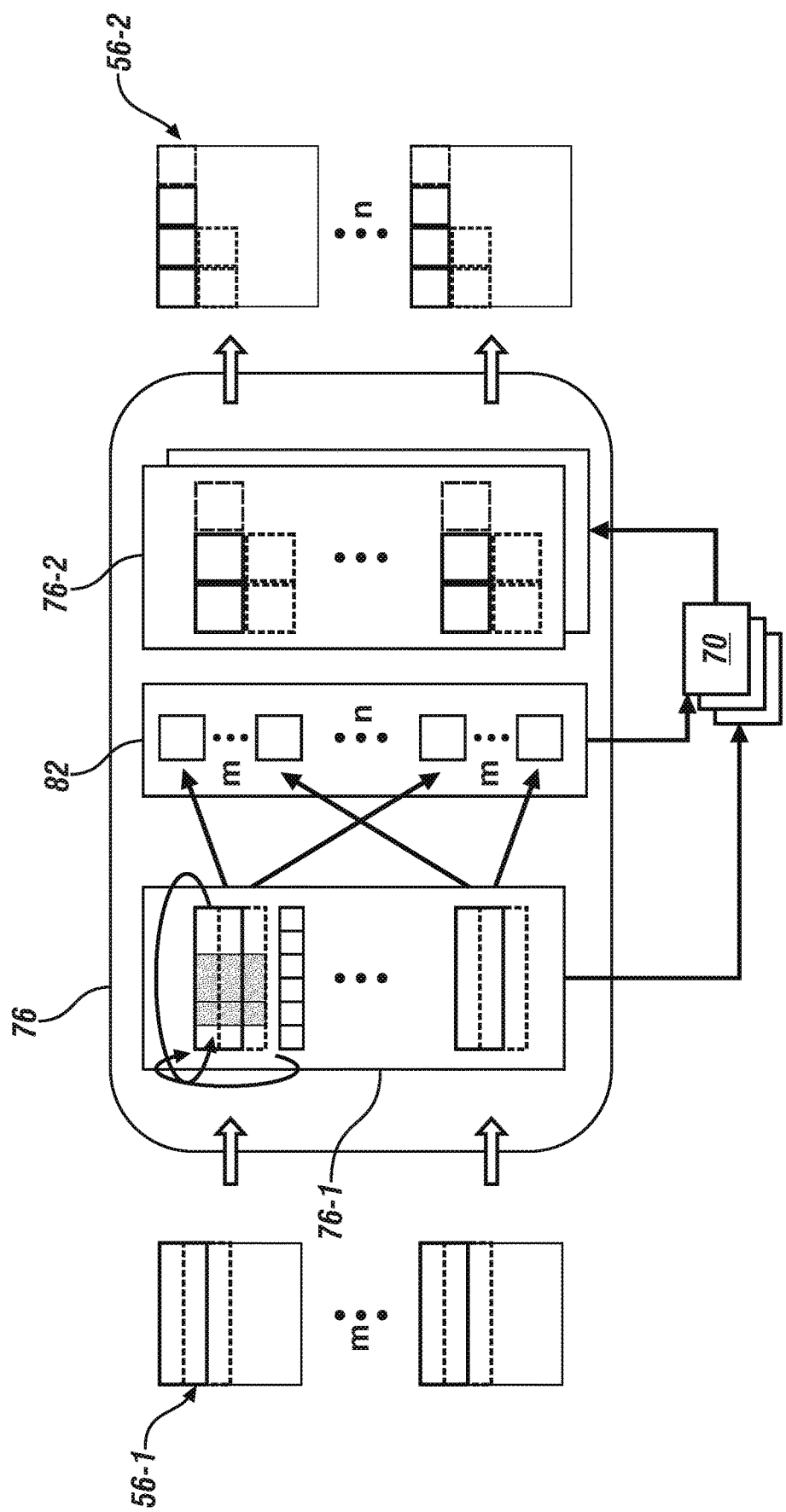
FIG. 6 schematically shows a data transfer schedule for managing data transfer between a system memory, a local memory buffer, and a PE, in accordance with the disclosure It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

FIG. 6 schematically shows a data transfer schedule for managing data transfer between the system memory 56, the local memory buffer 76 and one of the PEs 70 in a manner that effects transfer of input data associated with a bitmap image file 16 only once.

This includes scheduling updates of the input and output buffers 76-1, 76-2. Kernel parameters are relatively small, and are separately loaded in the device memory for operation of the PE 70.

Data captured in the system input memory 56-1, e.g., from bitmap image file 16, can be transferred to update the input buffer 76-1 on a row-by-row basis. The computation process includes as follows to read a quantity of data that fits into the input buffer 76-1, process it through the PE 70, and move the result to the output buffer 76-2, as follows:

Read (k+s) rows, wherein k represents the size of the kernel and s represents the stride. When only c<C column fits, wherein c represents quantity of columns in the bitmap image file 16, read c columns of data. After (k+s)*c of data is computed by the PE 70, read next c columns of data, and after processed s rows, read next s rows and c columns of data. In a similar manner, when input buffer>m*(k+s)*c, transfer every input only once, and when tile Tm<m, with a minimum transfer each input ⌈m/Tm⌉ time. The output buffer is updated by updating partially completed n feature maps, and swapping the output buffer for the next computation.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication interfaces may be arranged serially or in parallel. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system for dynamically processing a datafile, comprising:
    a central processing unit (CPU), an accelerator, a communication bus, and a system memory device, wherein the system memory device is configured to store the datafile;
    the accelerator including a local memory buffer, a data transfer scheduler, and a plurality of processing engines; and
    the local memory buffer including an input buffer and an output buffer, wherein the input buffer is in communication with an input register set for one of the processing engines and the output buffer is in communication with an output register set for the one of the processing engines;
    wherein the data transfer scheduler is arranged to manage data transfer between the system memory device and the local memory buffer, wherein the data transfer includes data associated with the datafile;
    wherein the local memory buffer is configured as a circular line buffer;
    wherein the data transfer scheduler includes a ping-pong buffer for transferring output data from the one of the processing engines to the system memory device; and
    wherein the local memory buffer is configured to execute cross-layer usage of the data associated with the datafile.

2. The system of claim 1, wherein the datafile comprises a bitmap image file including a field of view from a camera.

3. The system of claim 1, wherein the data transfer scheduler configured to manage the data transfer between the system memory device and the local memory buffer comprises the data transfer scheduler configured to manage the data transfer that includes data associated with a portion of the datafile.

4. The system of claim 1, wherein the local memory buffer configured as the circular line buffer comprises the local memory buffer configured to read and transfer a first quantity of rows of the datafile to the input buffer for processing by the one of the processing engines and concurrently update a next quantity of rows into the input buffer.

5. The system of claim 1, wherein the ping-pong buffer for transferring the output data from the one of the processing engines to the system memory device comprises the output buffer being arranged as a double buffer including a first output buffer portion and a second output buffer portion, a first switch, a second switch, and a plurality of logic devices.

6. The system of claim 5, wherein the plurality of logic devices are controlled to effect communication of the output data from the one of the processing engines to the first output buffer portion via the first switch coincident with the plurality of logic devices being controlled to effect communication from the second output buffer portion to the system memory device in a first iteration.

7. The system of claim 6, wherein the plurality of logic devices are controlled to effect communication of the output data from the one of the processing engines to the second output buffer portion via the first switch coincident with the plurality of logic devices being controlled to effect communication from the first output buffer portion to the system memory device during a second, subsequent iteration.

8. The system of claim 7, wherein the plurality of logic devices are controlled to effect the communication of the output data from the one of the processing engines to the second output buffer portion coincident with the plurality of logic devices being controlled to effect the communication from the first output buffer portion to the system memory device during the second, subsequent iteration only after the second output buffer completes the communication from the second output buffer portion to the system memory device and after the one of the processing engines generates the output data.

9. The system of claim 1, wherein the datafile comprises a bitmap image file of a field of view that is captured by a camera, and
    wherein the CPU employs the accelerator to extract a feature from the bitmap image file.

10. The system of claim 9, wherein the system is in communication with a control system that is disposed to execute a control action, and,
    wherein the control system is disposed to execute the control action based upon the feature that is extracted from the datafile.

11. A method for dynamically processing an image file employing a central processing unit (CPU), an accelerator, a communication bus and a system memory device configured to store the image file, wherein the accelerator includes a local memory buffer, a data transfer scheduler, and a plurality of processing engines, wherein the local memory buffer includes an input buffer and an output buffer, wherein the input buffer is in communication with an input register set for one of the processing engines and the output buffer is in communication with an output register set for the one of the processing engines, the method comprising:

arranging the data transfer scheduler to manage data transfer between the system memory device and the local memory buffer, wherein the data transfer includes data associated with the image file;

configuring the local memory buffer as a circular line buffer;

executing a ping-pong buffer in the data transfer scheduler to transfer output data from the one of the processing engines to the system memory device; and configuring the local memory buffer to execute cross-layer usage of the data associated with the image file;

extracting, via the accelerator, a feature from the image file; and executing, via a control system, a control action based upon the feature that is extracted from the image file.

12. The method of claim 11, wherein the image file comprises a bitmap image file including a field of view from a camera.

13. The method of claim 11, wherein arranging the data transfer scheduler to manage the data transfer between the system memory device and the local memory buffer comprises arranging the data transfer scheduler to manage the data transfer between the system memory device and the local memory buffer associated with a portion of the image file.

14. The method of claim 11, wherein configuring the local memory buffer as the circular line buffer comprises configuring the local memory buffer to read and transfer a first quantity of rows of the image file to the input buffer for processing by the one of the processing engines and concurrently updating a next quantity of rows into the input buffer.

15. The method of claim 11, wherein executing the ping-pong buffer in the data transfer scheduler to transfer the output data from the one of the processing engines to the system memory device comprises arranging the output buffer as a double buffer including a first output buffer portion and a second output buffer portion, a first switch, a second switch, and a plurality of logic devices.

16. The method of claim 15, comprising controlling the plurality of logic devices to effect communication of the output data from the one of the processing engines to the first output buffer portion via the first switch coincident with controlling the plurality of logic devices to effect communication from the second output buffer portion to the system memory device in a first iteration.

17. The method of claim 16, comprising controlling the plurality of logic devices to effect communication of the output data from the one of the processing engines to the second output buffer portion via the first switch coincident with controlling the plurality of logic devices to effect communication from the first output buffer portion to the system memory device during a second, subsequent iteration.

18. The method of claim 17, comprising controlling the plurality of logic devices to effect the communication of the output data from the one of the processing engines to the second output buffer portion coincident with controlling the plurality of logic devices to effect the communication from the first output buffer portion to the system memory device during the second, subsequent iteration only after the second output buffer completes the communication from the second output buffer portion to the system memory device and after the one of the processing engines generates the output data.

19. The method of claim 11, wherein the image file comprises a bitmap image file of a field of view that is captured by a camera, and wherein the extracting comprises extracting the feature from the bitmap image file.

20. The method of claim 19, comprising executing, via the control system, the control action based upon the feature that is extracted from the bitmap image file.

* * * * *